United States Patent [19]

Heys

[11] 4,236,998

[45] Dec. 2, 1980

[54] PROCESS AND APPARATUS FOR PURIFYING A FIBROUS SUSPENSION

[75] Inventor: Karel A. G. Heys, Gennep, Netherlands

[73] Assignee: Feldmühle Aktiengesellschaft, Viersen, Fed. Rep. of Germany

[21] Appl. No.: 16,499

[22] Filed: Mar. 1, 1979

[30] Foreign Application Priority Data

Mar. 3, 1978 [DE] Fed. Rep. of Germany ....... 2809142

[51] Int. Cl.³ .......................... B07B 1/04; B07B 1/36; D21D 5/04
[52] U.S. Cl. .................................. 209/246; 209/250; 209/269; 209/313; 209/353
[58] Field of Search ................ 209/250, 246, 267–269, 209/313, 401, 10, 353, 354, 240, 242, 311, 314; 210/407, 408, 388, 500, 325, 335, 499

[56] References Cited

U.S. PATENT DOCUMENTS

| | | | |
|---|---|---|---|
| 293,039 | 2/1884 | King | 209/267 |
| 630,123 | 8/1899 | Smith | 209/311 X |
| 1,294,309 | 2/1919 | Rowand | 209/354 |
| 2,267,327 | 12/1941 | Ellen | 209/269 |
| 2,457,018 | 12/1948 | Wantling | 209/269 X |
| 3,477,571 | 11/1969 | Maag | 209/250 |
| 3,817,376 | 6/1974 | Burstlein | 209/314 X |

FOREIGN PATENT DOCUMENTS

| | | | |
|---|---|---|---|
| 2429 | 9/1870 | United Kingdom | 209/401 |
| 703185 | 1/1954 | United Kingdom | 209/246 |

Primary Examiner—Ralph J. Hill
Attorney, Agent, or Firm—Toren, McGeady and Stanger

[57] ABSTRACT

In removing impurities, such as printing inks, binders, fiber fragments and pigments, from a fibrous suspension of waste paper containing water, the fibrous suspension is directed downwardly over an inclined sieve for removing the impurities through the sieve. In its length direction between its upper and lower ends, the sieve is divided into a number of individual sections. A triangularly shaped groove-like trough is located between the lower end of one section and the upper end of the next downwardly adjacent section. The trough extends transversely of the length of the sieve and is shaped to provide a swirling movement to the suspension flowing into the trough. At the outlet from the trough a flow-stemming device is provided for affording the uniform level of the suspension as it flows over the next section of the sieve.

19 Claims, 6 Drawing Figures

PROCESS AND APPARATUS FOR PURIFYING A FIBROUS SUSPENSION

The invention relates to a process and an apparatus for removing impurities, such as printing inks, binders and pigments, from a fibrous suspension of waste paper, in which the fibrous suspension is conveyed over an inclined sieve and the impurities are carried off through the sieve with a portion of the water from the fibrous suspension.

Washing processes in which inclined sieves are used to de-ink fibrous suspensions of waste paper, so-called grey stock, have been known for a long time and are distinguished by a high purification capacity because printing inks and pigments etc. are carried away with the liquor. The effective action of these inclined sieves is attributable to the fact that the position of the fibrous suspension changes continuously, that is to say, the fibres are rolled down over the sieve with the result that a filter bed is not formed. In order to achieve a uniform distribution of substances, the known inclined sieves have a very narrow width—approximately 1 m. In spite of this the distribution over this width is not 100% uniform, especially when the flow is observed further along the length of the sieve. Over the length of the sieve, which ranges from 3-4 m, dissociation of the fibrous suspension occurs and there is also a channeling effect. This "channeling effect" means that the flow over the total width of the sieve is uneven, as a result of which the removal of water and thus the removal of dirt particles varies, that is to say it is impaired.

The problem underlying the present invention is to assist the separation of fibrous materials and fine materials, and substantially to prevent the channeling effect and thus achieve a uniform distribution of flow. At the same time the suspension as such should be homogenized and dissociation prevented, and the throughput should be increased. Furthermore, it should be possible, without complicated readjustment of the plant, also to process a varying amount of fibrous suspension in the same plant.

These problems are solved by a process for removing impurities, such as printing inks, binders, fibre fragments and pigments, from a fibrous suspension of waste paper, in which fibrous suspension is passed over an inclined sieve, and the impurities are carried off through the sieve with a proportion of the water from the fibrous suspension by means of the fibrous suspension being accumulated in portions on the sieve and being subjected to a swirling motion.

The apparatus used for carrying out this process is an inclined sieve with the characterising feature that the sieve is divided lengthwise into sections, there is provided for each section a groove for swirling the fibrous suspension and there is arranged after each groove a flow-stemming device for homogenizing the flow.

The division of the sieve into individual sections means that the distance traversed by the fibrous suspension is relatively short and over this distance the suspension can, in practice, dissociate only slightly, if at all. The risk of the formation of currents on the sieve is thus substantially reduced. There is thus no channeling effect. When the fibrous suspension enters into the groove, which has no water-removing function, arranged after each section, it is rerouted, so as to result in a swirling effect, which causes homogenization of the fibre distribution in the suspension.

The flow-stemming device connected in series after each groove stems the flow of fibrous suspension across the width of the sieve to a uniform level and thus renders possible both homogenization of the flow and the use of larger widths of sieve, with the result that larger quantities of fibrous suspension can be processed.

The length of the individual sieve sections is advantageously between 600 and 1500 mm. A length of approximately 800 mm has proved particularly advantageous. Hitherto known sieves generally have markedly varying dewatering capacities over their total cross-section owing to the inadequate distribution of the fibrous suspension. The fibrous suspension dissociates, at the same time the viscosity varies, and differences in the fibre consistency arise as a result of which flow channels are formed. In these areas the speed of the fibrous suspension is higher and thus the dewatering capacity and the purifying capacity are lower.

The inclination of the sieve, which is advantageously between 35° and 45°, taken with the length range selected for the sieve section produces a very uniform flow, that is to say, when the lengths of the sieve sections are above 1000 mm a tendency towards channeling and dissociation of the fibrous suspension is observed, whilst when the lengths of the sieve sections are less than 600 mm, that is when the sieve sections are shortened further, there is no identifiable improvement in distribution or homogenization.

The installation angle of the sieve is of primary importance. The best capacities are obtained if the sieve is installed at an angle of 40°±5°. At this angle there is both maximum dewatering efficiency and maximum purification. In this range the fibres that are contained in the suspension roll over the sieve. The rolling of the fibres causes an additional movement, as a result of which foreign particles, such as inks, pigments and binders, adhering to the individual fibres, can be removed. The rolling movement also guarantees that none of the fibres gets stuck in the sieve around which further fibres could be deposited resulting in a blockage. The installation angle is thus also to a great extent responsible for the would-be automatic cleaning of the sieve.

Of substantial importance is a further arrangement of the invention which provides that the material of the sieve surface is an alloyed stainless steel. The sieve could theoretically, as is customary for sieves used in paper-making machines, consist of bronze cloth, or alternatively a synthetic cloth could be used. Both cloths have considerable disadvantages, however, and do not produce the desired result because the bronze is corroded after a short time and a rough surface is formed on the individual wire. Impurities are deposited on this rough surface and the sieve becomes blocked, thereby destroying its purifying action. Exactly the opposite effect is produced if synthetic sieves are used. Synthetic sieves, which are generally made of monofilaments, have such a smooth surface that the fibres, instead of rolling, slip over them. Consequently the dirt particles are not loosened from the fibres. The dewatering capacity is lower.

A preferred arrangement of the invention provides that the sieve surface is a wire cloth that has been produced in the form of a three-end twill. A three-end twill is a cloth in which the weft thread is directed over two warp threads, then under a warp thread and then over a further two warp threads, and so on. The same three-end twill is produced by analogous arrangement of the warp threads around the weft threads. It is very important, however, that the wire cloth used is a twill with a register of 1:2, the thus-characterised side of the twill facing the fibrous suspension. The weft, or in another method of weaving the warp, thus spans over two threads, these "bridges" being arranged transversely to the direction of flow of the fibrous suspension. Advantageously this "bridge" is formed by the weft threads, that is to say the warp is arranged in the direction of operation of the sieve, that is in the direction of the fibrous suspension. The rolling movement of the fibres on the sieve is promoted by this bridge formation. At the same time the distance from the exposed warp thread is so small that no fibres can get stuck there, but the water-removal is still good. The bridges also promote friction between fibres and sieve and increase the rolling tendency, i.e. the loosening of the dirt particles from the fibre.

The speed with which the fibrous suspension passes over the sieve depends essentially on the angle at which the sieve is arranged. This angle at the same time influences the dewatering capacity, that is to say the removal of impurities with the liquor. Sieves that are arranged relatively flat have a high water-removing capacity at the beginning, but there is a tendency for filter beds to form so that after a short time the water removal is inadequate and consequently there is no longer any useful purifying action. Sieves that are very steep are distinguished by inadequate dewatering and thus the purifying action on the fibrous suspension is also inadequate. If the selected tolerances are exceeded or fallen below, the result is a poorer purifying action.

In order to be able to make use of the high throughput speed of extremely steep sieves and still have a good purifying action, an advantageous arrangement of the invention provides that a vacuum be applied to the individual sieve sections. Advantageously, the individual values of the vacuum vary, in the manner that in the upper region, that is in the first sieve section, the largest vacuum is applied, and in the last sieve section the smallest vacuum, if it is at all necessary here, is applied. The vacuum can, as usual, be produced by vacuum pumps, but it is more advantageous, especially when the de-inking plants are arranged at a high level, to produce the vacuum by simple downpipes, which require less maintenance and less energy expenditure.

In order that a filter bed may not be formed, the vacuum applied should be decidedly low, and move within the range of from 50 to 500 mm, preferably 100 to 200 mm, water columns. The vacuum increases the dewatering capacity, that is to say the penetration of water through the sieve. Since the water is the carrier for the impurities, increased water removal means an improved purifying action. It is extremely important, however, that the vacuum is not so high that a filter bed is formed, because in that case the fibres would no longer be able to move freely, the individual fibres or fibre bundles would not roll and the purifying action would be substantially impaired.

According to a further advantageous arrangement of the invention it is proposed that the sieve be fitted with a vibrator and by this means be caused to vibrate. The vibration causes the fibrous suspension to move and, consequently, separation of the dirt particles from the fibres is promoted. The resulting pressure waves, which also cause a movement of the sieve cloth, considerably accelerate the water removal without a filter cake of fibres being formed on the cloth. Instead the fibres are lifted by the vibration, so that new liquid, that is, water laden with impurities, can always be removed through the meshes of the sieve. The vibration is particularly important when a fibrous suspension that has not been de-aerated is fed to the sieve, that is when fine air bubbles, which normally block the sieve, are present in the suspension. These air bubbles are both carried off through the sieve and returned to the suspension but, unlike in sieves that are not subject to vibration, cannot become lodged in the sieve.

An advantageous arrangement of the invention provides that the sieve as such, or individual sections of the sieve, are mounted on rubber buffers, that is that a resilient seating is provided in those areas that are acted on by the vibrator. It is particularly advantageous for the vibrator to be allotted to the first sieve section because it is here that the largest quantity of water is present and consequently the largest quantity of water can also be carried away successfully. The frequency of the vibrator is advantageously between 1000 and 6000 Hz., so that it is possible to use simple out-of-balance vibrators.

The groove arranged between every two sections of the sieve has, according to a preferred arrangement of the invention, a triangular cross-section, wherein the angle facing the flow, or the direction of operation of the sieve, is rounded. The triangular cross-section of the groove produces excellent and thorough mixing of the fibrous suspension. The rounded angle prevents any particle deposit.

The short side of the triangular groove is advantageously associated with the inlet and the long side of the triangular groove with the outlet. As a result the long side guarantees a large mixing surface, that means thorough mixing, so that a homogeneous suspension is obtained again.

The longest side of the triangle is flush with the sieve and is in no way covered. The short side forms with the sieve an angle of aproximately 130° (±20°) so that the fibrous suspension passes over this incline to the rounded vertex of the triangle. Depending on the flow rates and also on the level of the fibrous suspension above the sieve, the liquid follows the short side, or separates from it and passes instead to the rounded vertex of the triangle, wherein at high speed, that is when the suspension separates from the short side, a whirl of clockwise direction is produced, whilst at low speed, when there is practically no separation of the suspension from the short side, a whirl of anti-clockwise direction is produced. This whirling results in very good mixing of the fibrous suspension, which thus becomes homogeneous again so that blockages of the sieve here and there are avoided and there is thus no channeling effect.

Adjacent to the long side of the triangle, which extends substantially horizontally and returns the fibrous suspension on to the sieve, at its outermost region, is the flow-stemming device.

According to a very advantageous arrangement of the invention, the flow-stemming device consists of a rotatably mounted weir having an outlet opening, which is adjustable in size, formed at the base, that is in the region of the sieve. The outlet opening of the weir is a slot which extends over the entire width of the sieve. It is formed by a baffle plate that is adjustable in height. This height adjustment renders possible a rough adjustment of the size of the slot. Fine adjustment is effected by rotating the weir, that is to say that the baffle plate can be set at a certain angle to the sieve. By inclining the baffle plate, it overlaps the sieve area adjacent to the groove, and consequently, by means of the exit angle produced, a quick removal of water is promoted. The fibrous suspension is thus accumulated either directly at the outlet of the groove or in the adjacent sieve area shortly after the groove, and passes through a gap, which is arranged beneath the weir and is of the same size over the entire width of the sieve, wherein it is swirled both in the groove and as a result which is evident from the high throughput quantities, but this also explains the variations in consistency, which render difficult an exact comparison of the increase in capacity. Compared with a throughput of 25 $m^3$ per hour and per $m^2$ of sieve surface in the usual standard sieve, if a sieve according to the invention is used a throughput of more than 40 $m^3$ per hour and per $m^2$ of sieve surface is achieved, that is an increase of more than 60%.

| Raw material (waste paper) | Throughput in $m^3/h$ Q | Consistency in % K | Solids content kg/h M | Ash content % As | Ash content As | Degree of grinding SR° | Comments |
|---|---|---|---|---|---|---|---|
| containing wood pulp | | | | | | | |
| supply | 200 | 1.168 | 2336 | 13.5 | 315.36 | 60 | Job was carried out on |
| discharge | 81 | 2.251 | 1824 | 8.0 | 145.92 | 40 | 2 customary sieves con- |
| filtrate | 119 | 0.430 | 512 | 33.2 | 169.98 | — | nected in parallel each having a sieve surface of 1 × 4 $m^2$, that is a total sieve surface of 8 $m^2$. |
| supply | 200 | 1.240 | 2480 | 14.0 | 347.20 | 62 | Job was carried out on |
| discharge | 87 | 2.364 | 2054 | 10.1 | 207.45 | 43 | 1 sieve according to |
| filtrate | 113 | 0.377 | 426 | 32.8 | 139.72 | — | the invention having a total sieve surface of 4.8 $m^2$ (width 2m, length: 3 sections each 0.8 m long) |
| supply | 200 | 1.195 | 2390 | 14.2 | 339.38 | 60 | Job was carried out on |
| discharge | 61 | 2.755 | 1680 | 8.0 | 134.40 | 37 | a sieve according to |
| filtrate | 139 | 0.511 | 710 | 29.0 | 205.90 | — | the invention having a total sieve surface of 4.8 $m^2$; a vibrator of approximately 3000 Hz was connected to the first sieve section |
| free of wood pulp | | | | | | | |
| supply | 200 | 0.765 | 1530 | 14.2 | 217.26 | 44 | as A |
| discharge | 50 | 2.28 | 1140 | 4.9 | 55.85 | 19 | |
| filtrate | 150 | 0.26 | 390 | 41.38 | 161.38 | — | |
| supply | 200 | 0.784 | 1568 | 18.4 | 288.51 | 51 | as B |
| discharge | 68 | 1.564 | 1063 | 11.0 | 116.93 | 30 | |
| filtrate | 132 | 0.383 | 505 | 33.97 | 171.58 | — | |
| supply | 200 | 0.832 | 1664 | 18.8 | 312.83 | 54 | as C |
| discharge | 48 | 2.264 | 1086 | 9.4 | 102.08 | 23 | |
| filtrate | 152 | 0.380 | 578 | 36.49 | 210.75 | — | | of passing through the gap and in addition is uniformly distributed over the full width of the sieve.

A preferred arrangement of the invention provides that the size of the outlet opening under the weir is adjustable by a weighted lever, which engages in the pivot point of the weir. The weir is pendulous, so that the flow of liquid regulates the size of the outlet opening. The great advantage of this arrangement is that with it it is possible to handle different throughput quantities without complicated readjustment by hand. The flow-stemming devices in any case ensure that the accumulating fibrous suspension is distributed uniformly over all regions, since the weir opens further or closes further depending on the accumulation of fibrous suspension.

The following table shows a comparison of the hitherto customary sieves with the sieves according to the invention. It can be seen that two customary commercial sieves must be connected in parallel producing a total sieve surface of 8 $m^2$, which means that a large amount of space is required in a building to achieve approximately the same capacity that a sieve according to the invention having a total sieve surface of 4.8 $m^2$ has. The test data are values measured in a factory, The following Examples illustrate the invention:

EXAMPLE 1

The consistency of a fibrous suspension of wood pulp-free waste paper which is to be purified is, before it is fed onto the first sieve, 0.832%. The first sieve has a width of 2.00 m, operates at approximately 200 $m^3$/hour, and is vibrated by a vibrator. The length of the sieve is 2.40 m; the sieve is divided into three sections each 0.8 m long. As a result of the separation of the very fine materials and fillers, the combination of the degree of grinding changes. After the first complete sieve a change from 54 SR (Schopper-Riegler) to 23 SR is achieved. The ash content changes from 18.8% to 9.4%. The consistency increases to 2.264%. Per $m^2$ of sieve surface per hour, up to 45 kg of ash are separated off, in comparison with 25 kg of ash in conventional sieves. After the first complete sieve, a second sieve is connected over which the now thickened, but rediluted fibrous suspension is conveyed. This sieve has a width of 0.50 m, but is of the same length and is again divided into three sections. After diluting the quantity of fibrous suspension, reduced to 48 $m^3$/hour, with 52 m³/hour of water, the sieve is supplied with approximately 100 m³/hour. The solids content of 1.086% is increased in the second sieve to approximately 4%. The SR value changes from 23 to 16, the ash content drops to 3.3%. With this value, the value of pure cellulose, which is approximately 14, is almost achieved, that is to say, as a result of this washing cellulose is theoretically produced. The increase in whiteness is 8 to 10 points (Elrepho, Filter 457).

EXAMPLE 2

The consistency of the fibrous suspension of wood pulp-containing waste paper which is to be purified is, before it is fed onto the sieve, 1.195% solids. The suspension is treated analogously to Example 1. After the first sieve the consistency changes to 2.755, the degree of grinding from 60 to 39 and the ash content drops from 14.2 to 8.0%. The quantity of thickened fibrous suspension is 61 m³/hour. After diluting to 100 m³/hour and applying to an analogous sieve 0.60 m wide, the result is a consistency of 5.0%, at an initial consistency of 1.68%, a reduction to 29° SR, an ash content of 5% and a final consistency of approximately 4%. The increase in whiteness is up to 6 points.

The invention is explained in the following with reference to the drawings:

FIG. 3a is a detail of the encircled portion of FIG. 3.

Figure 4:
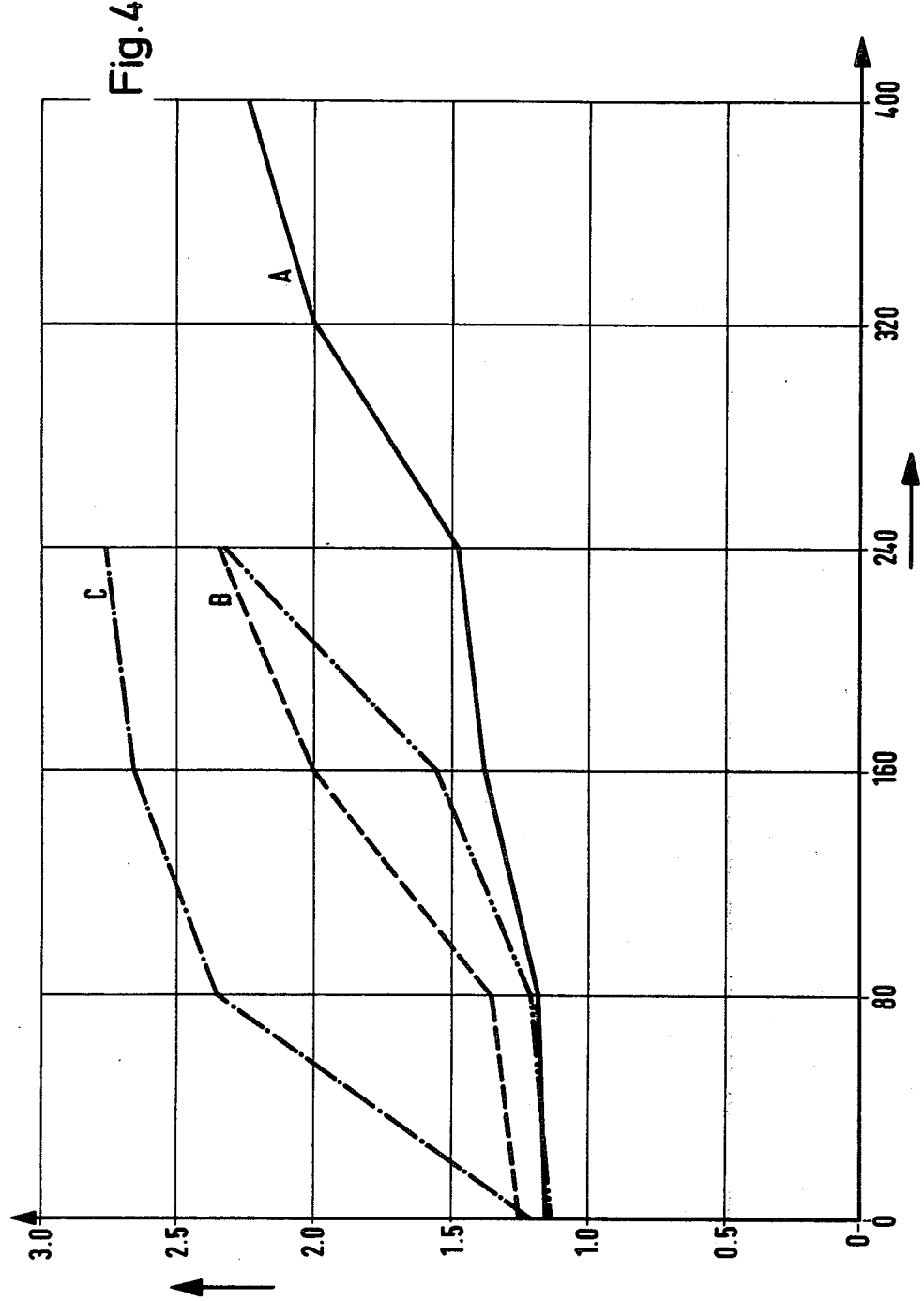
FIG. 4 shows dewatering curves of a fibrous suspension of wood pulp-containing waste paper.
Figure 5:
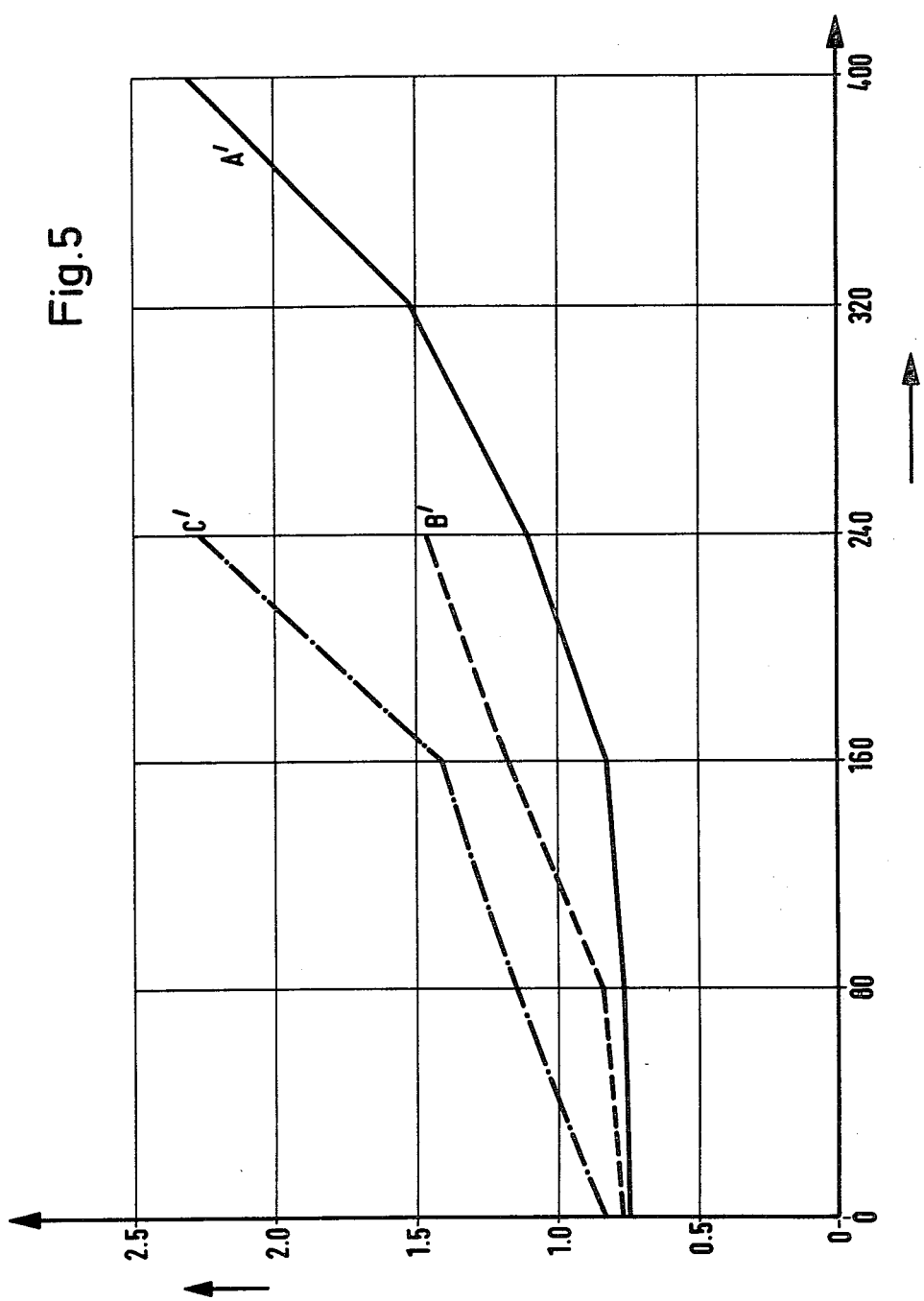
FIG. 5 shows dewatering curves of a fibrous suspension of wood pulp-free waste paper.

The curve A in FIG. 4 and the curve A' in FIG. 5 show the progress of the water removal, that is the increase in consistency and thus the thickening, in a conventional sieve of 4 m length in which the throughput is approximately 25 m³/per hour and per m² of sieve surface. Curve B and B' show the dewatering capacity of the sieve construction according to the invention and curve C and C' the dewatering capacity of the sieve construction according to the invention to which a vibrator is connected. The curves show that, especially in the case of wood pulp-containing raw paper, the dewatering capacity and thus the purifying action can be considerably improved when a vibrator is used. Fibrous suspensions of wood pulp-free waste paper are handled at a substantially higher degree of dilution than a fibrous suspension of wood pulp-containing paper. The dewatering capacity in the first sieve sections is decidedly moderate if there are no aids, that is to say the water gushes over the sieve substantially without any purifying action. By using a vibrator, however, it is possible even over the short distance of 2.40 m to achieve a perfectly satisfactory water removal.

The fibrous suspension 1 is fed, by a means not shown, to a distributor 2, which has a groove-like cross-section and is arranged at the top of the inclined sieve 3. The distributor 2 extends over the entire width of the inclined sieve 3 and is separted from the inclined sieve 3 by a flow-stemming device 4. The inclined sieve 3 is divided into sections 5, which consist of a box 6, which is connected in the lower region to downpipes 7 and is defined with respect to the fibrous suspension 1 by a sieve surface 8. The sieve surface 8 consists of a cloth that has 25:21.5 wires per cm and is a three-end twill. The wire material is an alloyed steel according to US Norm AISI 316. The warp is arranged in the direction of operation of the sieve, that is to say in the direction of movement of the fibrous suspension 1; the weft runs crosswise. The upper side, which is in contact with the water, displays the weft threads, each of which runs over two warp threads then underneath a warp thread. This surface 8 is welded to the box 6 of which the lateral boundaries are formed by square tube profiles 9. At the base side the box 6 is covered by a base plate 10 which is welded to the square tube profiles 9.

Figure 3:
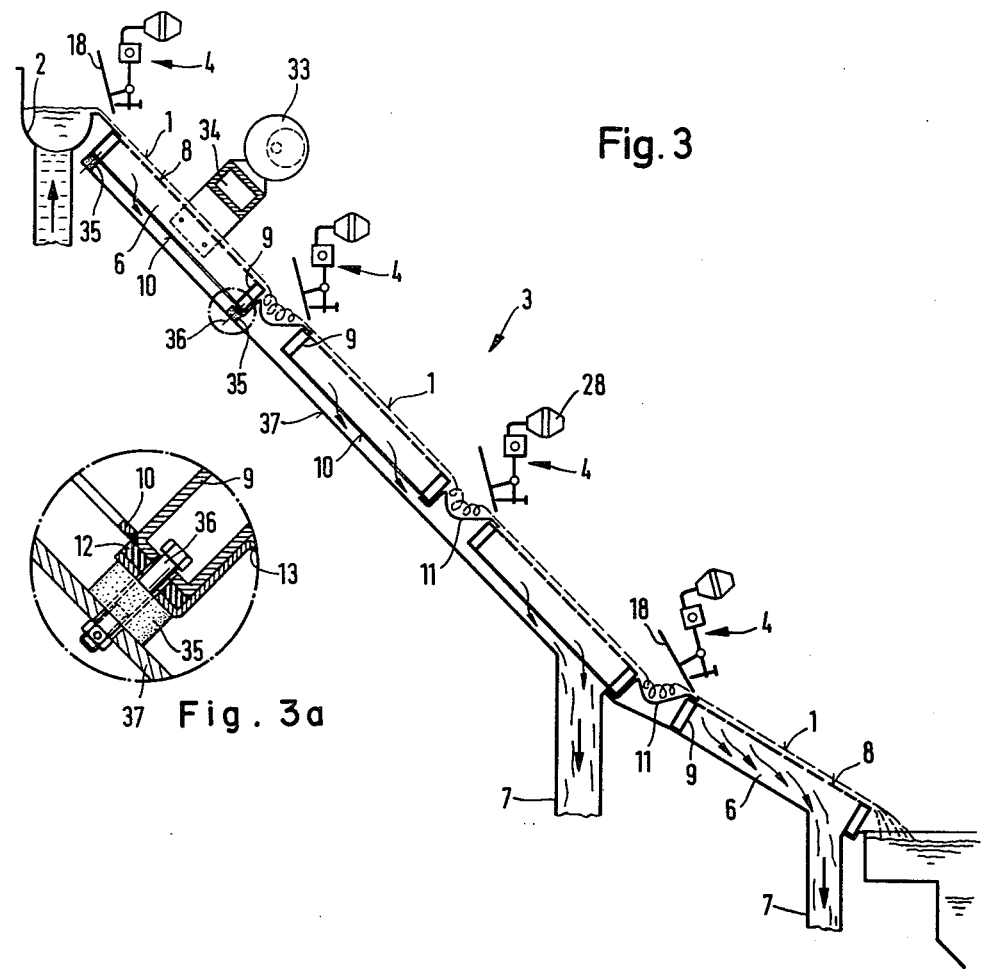
FIG. 3 shows a further arrangement of the divided sieve analogously to FIG. 1.

As shown in FIG. 3, the first of these boxes 6 is provided with a bridge 34 to which the vibrator 33 is attached. The vibrator 33 transmits the vibrations to the box 6 by means of the bridge 34, and this box 6 rests on the base plate 37 by way of rubber buffers 35, which are joined to the square tube profiles 9 by means of guide bolts 36.

Figure 1:
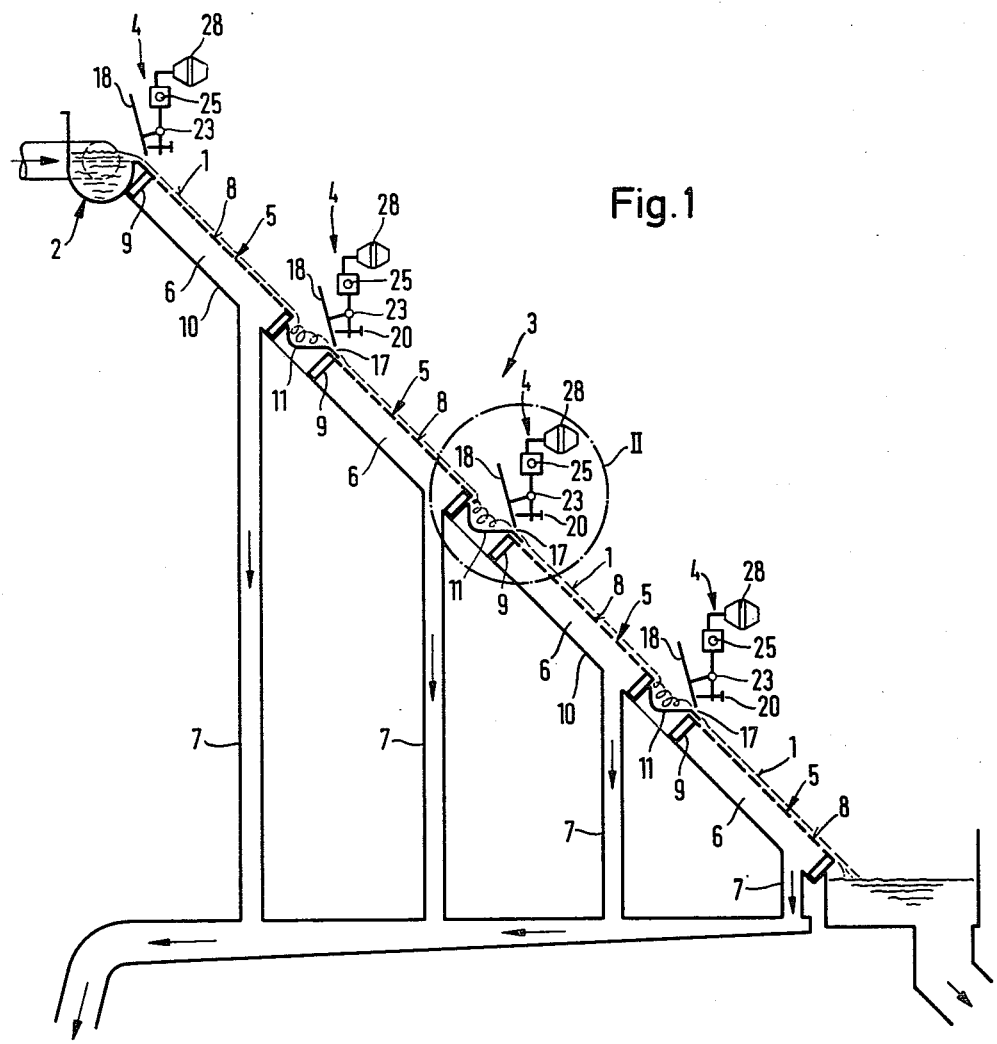
FIG. 1 shows a inclined sieve, divided into sections, with downpipes connected to it and with grooves and flow-stemming devices.
Figure 2:
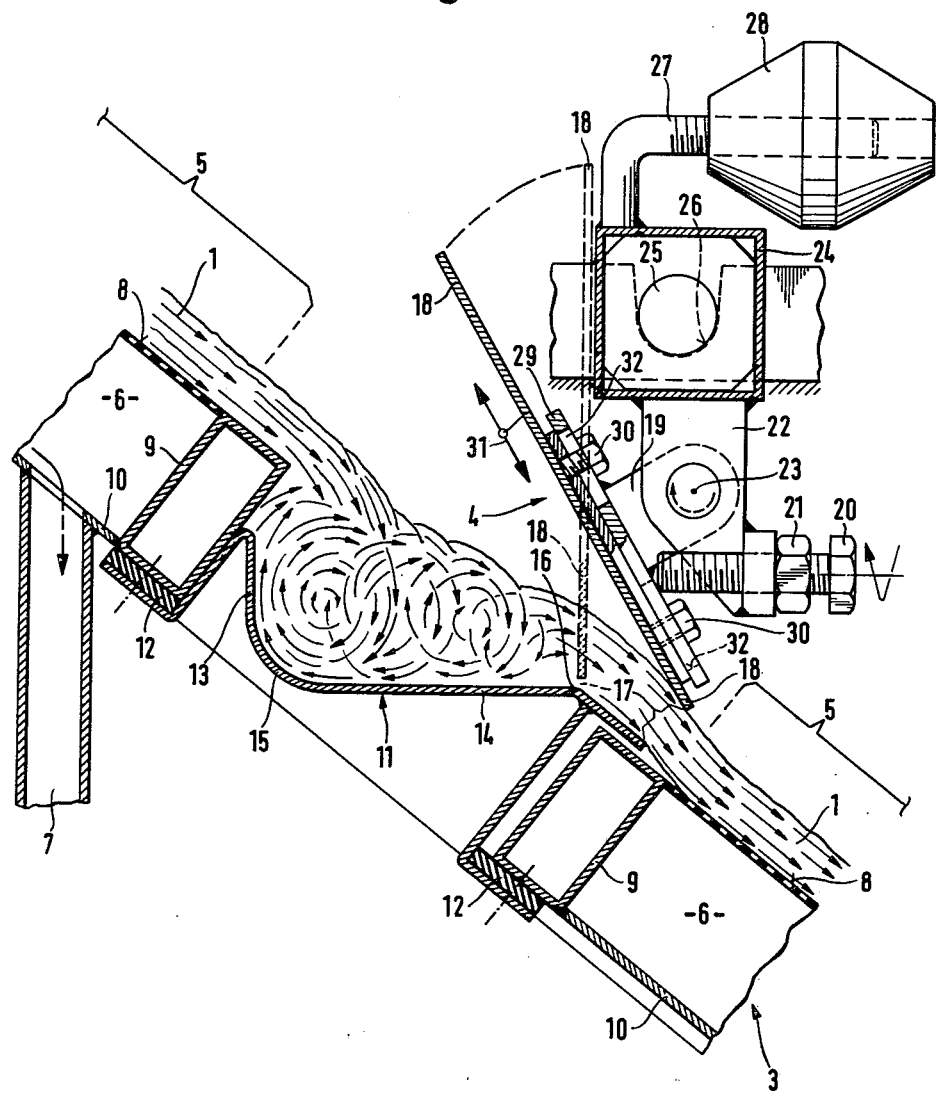
FIG. 2 shows on an enlarged scale a detail from FIG. 1, showing a groove and flow-stemming device.

There is arranged between the individual sections 5 a groove or trough 11 (FIG. 2) which has a triangular cross-section. It is joined to the square tube profile 9 be sealing strips 12. The short side 13 of the groove 11 forms an angle of approximately 90° with the long side 14, the vertex being rounded by a curve 15 having a radius of approximately 20 mm. At the end 16 of the long side 14 an outlet opening 17 is produced by the acting flow-stemming device 4.

The flow-stemming device 4 is designed as a weir and consists of a baffle plate 18, which is screwed by screws 30 to a flange 29. The flange 29 has elongated holes 32, which render possible displacement of the baffle plate 18 in the direction of the double arrow 31. Welded to the flange 29 are bearing blocks 19, which render possible a pivoting movement of the baffle plate 18. The pivot movement is limited by stop screws 20, which are fixed by counter-nuts 21. The bearing blocks 19 are joined by bearing bolts 23 to the abutments 22, which are welded to the cross member 24. This cross member 24 extends over the entire width of the inclined sieve 3 and at its outer ends has journals 25 which rest in bushes 26. Arranged on two levers 27, which are welded at right angles to the cross member, are adjustable weights 28 which can be moved for the purpose of adjustment.

The fibrous suspension 1 passing over the inclined sieve 3 pours into the groove 11, swirls around and thus the fibres are distributed in the fibrous suspension 1 again. The suspension then presses against the baffle plate 18, which bears against the stop screws 20. As the pressure increases, the cross member 24 is turned in the bushes 26, and the size of the outlet opening 17, which depends on the flow speed and the flow quantity of fibrous suspension 1, is thus adjusted automatically.

I claim:

1. Process for removing impurities, such as printing inks, binders, fibre fragments and pigments, from a fibrous suspension of waste paper containing water, comprising passing the fibrous suspension downwardly over an inclinded sieve from an upper end to a lower end and removing the impurities through the sieve with a proportion of the water from the fibrous suspension, wherein the improvement comprises interrupting the downward flow of the fibrous suspension over the inclined sieve at least once between the upper end and lower end and directing the interrupted downward flow into a groove-like trough in the downward flow path over the sieve and shaping the surfaces of the trough in the direction between the upper end and lower end for subjecting the fibrous suspension flowing into the trough to a swirling motion about an axis extending transversely of the direction between the upper and lower ends for homogenizing the flow entering the trough and returning the homogenized fibrous suspension from the trough onto the sieve for downward flow thereover below the trough.

2. Process, as set forth in claim 1, including the step of spreading the flow of the fiber suspension exiting from the trough to a uniform level across the sieve.

3. Process, as set forth in claim 1, including the step of arranging the inclination of the sieve in the range of 35° to 45° to the horizontal.

4. Apparatus for removing impurities, such as printing inks, binders, fibre fragments and pigments, from a fibrous suspension of waste paper containing water, in which the fibrous suspension is conveyed downwardly, comprising an inclined sieve over which the fibrous suspension flows downwardly with impurities being carried off through said sieve with a proportion of the water from the fibrous suspension, said sieve having an upper end and a lower end with the length of said sieve extending between the upper and lower ends, characterized in that said sieve is divided along its length into sections, a groove extending transversely of the length direction and located between the lower end of one said section and the upper end of the downwardly adjacent said section, said groove being arranged to receive the fibrous suspension from the lower end of said one section and being shaped for swirling the fibrous suspension about an axis extending transversely of the length direction of said and a flow-stemming device associated with each said groove and located at the upper end of the downwardly adjacent said section for homogenizing the flow exiting from said groove onto the upper end of the downwardly adjacent said section.

5. Apparatus according to claim 4, characterized in that the length of each of said individual sections is 600 to 1500 mm.

6. Apparatus according to one of the claims 4 or 3, characterized in that said groove has a triangular cross-section in the length direction of said sieve, said triangular cross-section comprising a short side and a long side with the apex formed by the intersection of said short and long sides being rounded.

7. Apparatus according to claim 6, characterized in that said short side of the triangular groove extending from the lower end of said one section and the long side of the triangular groove extending from the rounded apex to the upper end of the downwardly adjacent said section.

8. Apparatus according to claims 4 or 5, characterized in that said flow-stemming device comprises a weir rotatably mounted about an axis extending transversely of the length direction of said sieve and forming in combination with said groove an outlet opening which is adjustable in size.

9. Apparatus according to claim 8, characterized in that a weighted lever is connected to said weir for rotating said weir about the axis thereof for adjusting the size of said outlet opening.

10. Apparatus according to claims 4 or 5, characterized in that the inclination of said sieve is between 35° and 45° relative to the horizontal.

11. Apparatus according to claims 4 or 5, characterized in that said sieve having a surface formed of an alloyed stainless steel.

12. Apparatus according to claim 11, characterized in that said sieve surface comprises a wire cloth produced in the form of a three-end twill.

13. Apparatus according to claim 12, characterized in that the wire cloth is a twill with a register of 1:2.

14. Apparatus according to claims 4 or 5, characterized by means for applying a vacuum to said individual sections of said sieve.

15. Apparatus according to claim 14, characterized in that said means for applying the vacuum comprises a downpipe connected to the lower end of each of said individual sections.

16. Apparatus according to claim 4 or 5, characterized by a vibration being connected to said sieve.

17. Apparatus according to claim 16, characterized by rubber buffers mounting said sieve.

18. Apparatus according to claim 17, characterized in that said vibrator being connected to said individual section of said sieve extending downwardly from the upper end thereof.

19. Apparatus according to claim 18, characterized in that said vibrator has a frequency of between 1000 and 6000 Hz.

* * * * *